(12) United States Patent
Raybaud et al.

(10) Patent No.: US 7,608,239 B2
(45) Date of Patent: Oct. 27, 2009

(54) PROCESS FOR THE STORAGE OF HYDROGEN USING A SYSTEM THAT STRIKES A BALANCE BETWEEN A MATERIAL THAT CONSISTS OF MAGNESIUM ELEMENTS AND MAGNESIUM NITROGEN ELEMENTS AND NITROGEN AND THE CORRESPONDING HYDRIDE

(75) Inventors: Pascal Raybaud, Rueil Malmaison (FR); François Ropital, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 554 days.

(21) Appl. No.: 11/347,578

(22) Filed: Feb. 6, 2006

(65) Prior Publication Data
US 2006/0193767 A1    Aug. 31, 2006

(30) Foreign Application Priority Data
Feb. 7, 2005    (FR) .................................. 05 01230

(51) Int. Cl.
*C01B 3/04*    (2006.01)
(52) U.S. Cl. ..................... 423/658.2; 423/650; 423/651
(58) Field of Classification Search ................ 423/658.2
See application file for complete search history.

(56) References Cited

U.S. PATENT DOCUMENTS 6,672,077 B1    1/2004    Bradley et al.

6,967,012 B2 *    11/2005    Meisner et al.    ............. 423/413
2003/0013605 A1    1/2003    Klassen et al.
2003/0129126 A1 *    7/2003    Chen et al.    .................. 423/645

FOREIGN PATENT DOCUMENTS

| DE | 35 35 378 A1 | 4/1987 |
| EP | 0 360 203 A | 3/1990 |
| WO | WO 2005/005310 A | 1/2005 |

OTHER PUBLICATIONS

H. Leng et al. "New Metal-N-H System Composed of Mg(NH2)2 and LiH for Hydrogen Storage," Journal of Physical Chemistry, vol. 108, 2004, pp. 8763-8765.

* cited by examiner

*Primary Examiner*—Melvin C Mayes
*Assistant Examiner*—Kenneth Vaden
(74) *Attorney, Agent, or Firm*—Millen, White, Zelano & Branigan, P.C.

(57) ABSTRACT

A process for the reversible storage of hydrogen, comprising bringing into contact a material that consists of magnesium elements and nitrogen elements with gaseous hydrogen leading to the formation of an amide or corresponding hydrides, comprises the use of a balanced system corresponding to the formula:

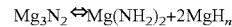

$Mg_3N_2 \Leftrightarrow Mg(NH_2)_2 + 2MgH_n$ where n is the number of hydrogen atoms corresponding to the stoichiometry of the hydride or hydrides formed. The material can also comprise, in a minor proportion, at least one transition metal of groups 3 to 12 of the periodic table that is selected from among Sc, Ti, V, Cr, Mn, Fe, Co, Ni, Cu, Zn and Pd.

10 Claims, 2 Drawing Sheets

PROCESS FOR THE STORAGE OF HYDROGEN USING A SYSTEM THAT STRIKES A BALANCE BETWEEN A MATERIAL THAT CONSISTS OF MAGNESIUM ELEMENTS AND MAGNESIUM NITROGEN ELEMENTS AND NITROGEN AND THE CORRESPONDING HYDRIDE

FIELD OF THE INVENTION

This invention relates to a process for reversible storage of the hydrogen using new materials that are potentially advantageous for the storage of hydrogen.

PRIOR ART

Within the scope of research of new energy systems, the development of processes for storage and transport of hydrogen seems to be very important. Compounds based on metal elements or metalloid-nitrogen elements were examined.

The publication of Leng et al. J. Phys. Chem. B 2004, 108, 8763-8765 examines the hydrogen storage properties of a 3Mg(NH2)2:8LiH mixture. Document US 2003/0129126 Al also essentially relates to lithium-based materials that can be used for storing hydrogen. However, the excessive stability of lithium hydride makes these materials less favorable thermodynamically in the reversible storage of hydrogen.

Document WO 2005/005310 A describes a composition that can be used for storing hydrogen comprising a hydrogenated state and a dehydrogenated state. In the hydrogenated state, this composition consists of an amide and a hydride. In the dehydrogenated state, the composition comprises an imide, therefore an already partially hydrogenated compound.

OBJECT OF THE INVENTION

This invention relates to a process for reversible storage of hydrogen using new materials that are potentially advantageous for the storage of hydrogen (theoretically more than 5% by mass) under the following conditions, defined by the pressure-temperature isothermal plateau:

270 K<T<370 K
and 1<P<10 atm (or about 0.1 MPa<P<about 10 MPa).

These new materials comprise a balanced system that is formed between a material that consists of magnesium elements and nitrogen elements and the corresponding hydride; they are more particularly of the type:

Mg$_3$N$_2$ ⇔ Mg(NH$_2$)$_2$.

The role of nitrogen, by forming the nitride phase of magnesium in equilibrium with the magnesium amide Mg(NH$_2$)$_2$, is to improve the thermodynamic properties of the simple magnesium hydride. The Mg(NH$_2$)$_2$ structure is known.

DETAILED DESCRIPTION OF THE INVENTION

Figure 1:
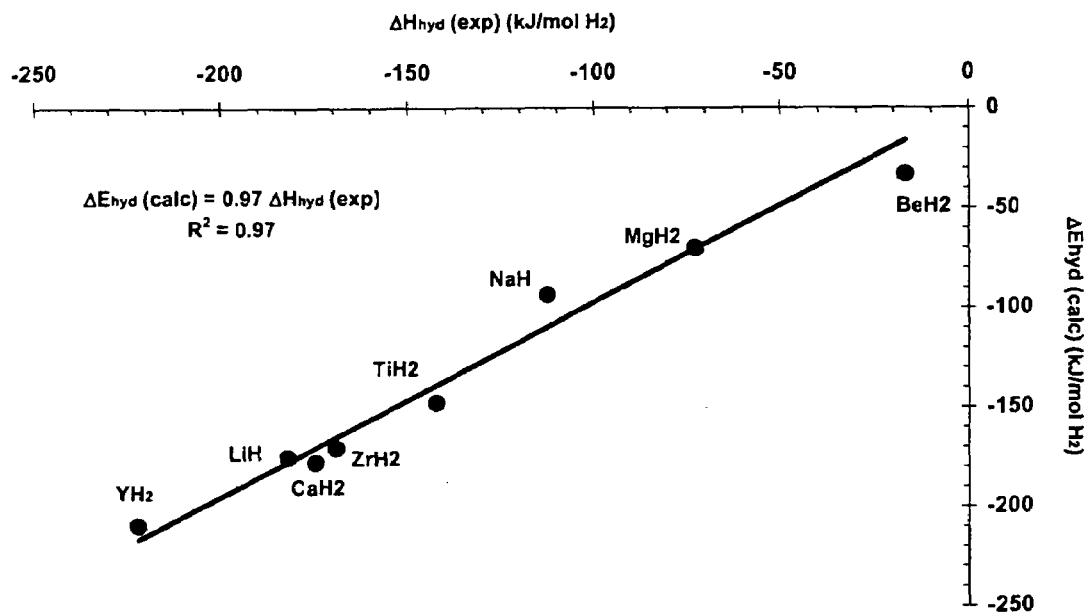
FIG. 1 is the diagram plotting the calculated values of $\Delta E_{hyd}$ and the experimental values $\Delta H_{hyd}$ of the literature.

In the storage process according to the invention, the materials that consist of magnesium elements and nitrogen elements are brought into contact with gaseous hydrogen and thus lead to the formation of (a) corresponding hydride compound(s) (hydrogen absorption). By slightly increasing the temperature or slightly reducing the hydrogen pressure, the formed hydride restores the hydrogen (desorption). It is therefore a reversible storage process.

Many useful properties of a solid material can be derived directly from determining its chemical cohesion energy. This cohesion energy is intrinsically based on the chemical composition, the local atomic structure of the material, its electronic properties, and all the physical properties that are derived therefrom. Quantum physics and more specifically the density functional theory (whose abbreviation DFT is obtained from the English "Density Functional Theory") provide a reliable base for the quantitative prediction of structural, electronic and thermodynamic properties of an atomic, molecular or crystalline structure before any attempt at synthesis of the laboratory material (see: W. Kohn, L. J. Sham, Phys. Rev. A 140, 1133 (1965)). In particular, the formalism of the DFT, as it is implemented in many current quantum software applications, such as:

the "Vienna Ab initio Simulation Package"(VASP) (see: G. Kresse, J. Hafner, Phys. Rev. B 48 (1993) 13115; G. Kresse, J. Furthmiiller, Phys. Rev. B 6 (1996) 15; as well as the address URL: http://www.cms.mpi.univie.ac.at/vasp/; references [1]);

"CASTEP" (see: http://www.tcm.phy.cam.ac.uk/castep/), and

"Gaussian" (see: http://www.gaussian.com), has as a central object the determination of the electronic wave function of a material that is simulated by an approximate solution to the famous Schrodinger equation. Access to the wave function makes possible the development of a predictive and quantitative methodology of the chemical bond in an atomic, molecular or crystalline structure.

In the search for new materials for the storage of hydrogen, the experimenters need to rely on the knowledge and a methodology of the chemistry of the solid. On the basis of thermodynamic concepts such as the formation enthalpy, the relative stabilities of the structures of materials can be quantified based on temperature and pressure conditions. The modem techniques of quantum calculation such as the DFT offer the advantage of relying on a minimal knowledge of empirical data for determining these same thermodynamic properties. Thanks to the knowledge of basic constants of physics, these techniques, thus often called "ab initio," therefore make it possible to predict the energy stability and the physico-chemical properties of a crystalline structure defined by its composition and its crystallographic mesh, independently of any experimental approach. Moreover, these techniques make it possible to eliminate experimental uncertainties on the structure of a material.

The use of intermetallic hydrides as materials for storing hydrogen is based on the following chemical balance:

$$\frac{2}{n}M + H_2 \rightarrow \frac{2}{n}MH_n \tag{1}$$

where M represents the stable metallic phase being transformed into the stoichiometric hydride phase MH$_n$.

This hydride phase has a theoretical mass storage capacity that is equal to nMH/(nMH+MM)×100%, where MH is the molar mass of atomic hydrogen and MM is that of metal.

The thermodynamic characteristics of transformation (1) are described by a pressure-temperature isotherm. When the two hydride and metal phases co-exist, the isotherm has a plateau. Temperature T and equilibrium pressure $P_{eq}$ of the plateau are determined by the Van't Hoff equation:

$$\frac{2}{n}\ln\left(\frac{P_{eq}}{P^0}\right) = \frac{\Delta H_{hyd}}{RT} - \frac{\Delta S_{hyd}}{R} \qquad (2)$$

where:

$\Delta H_{hyd}$ (or $\Delta S_{hyd}$) represents the enthalpy variation (or the entropy variation) of transformation (1);

R=8.314510 J.mol$^{-1}$.K$^{-1}$ is the molar constant of the ideal gases, and $P^0$=1 bar is the standard pressure (or 0.1 MPa).

This approach can be generalized for hydrides of metal alloys, $AB_x$, in the following way:

$$\frac{2}{n}AB_x + H_2 \rightarrow \frac{2}{n}AB_xH_n \qquad (3)$$

where A and B are two metal elements and x is the atomic ratio B/A in the alloy.

It is commonly recognized that the primary contribution according to the terms of entropic variation $\Delta S_{hyd}$ is the loss of entropy of the hydrogen molecule that passes from the gas phase in an adsorbed state into the solid state of the final hydride. The value of $\Delta S_{hyd}$ is known for being close to 130 J. K$^{-1}$.mol$^{-1}$ of $H_2$, regardless of the hydride (see: "Hydrogen-Storage Materials for Mobile Applications,"L. Schlapbach, A. Zuittel, Nature 414 (2001) 353-358 reference [2]; and "Hydrogen Storage Properties of Mg Ultrafine Particles Prepared by Hydrogen Plasma-Metal Reaction," H. Shao, Y. Wang, H. Xu, X. Li, Materials Science Engineering B 110 (2004) 221-226, reference [3]). Below, we retained this value. According to equation (2), also valid for reaction (3), the logarithm of the pressure at equilibrium, $P_{eq}$, varies linearly with the opposite of temperature T. The slope of the linear relationship is determined by $\Delta H_{hyd}$. In the following examples, we will show, thanks to the Van't Hoff diagrams, the variations of the logarithm of $P_{eq}$ based on 1/T (more specifically 1000/T for reasons of providing units). Such diagrams make it possible to identify potentially advantageous materials for storing hydrogen in a targeted range of $P_{eq}$ and T Consequently, the prediction (by a reliable theoretical approach) is of major interest for the knowledge of temperature and pressure conditions in which the metal or alloy is transformed into hydride. Since $\Delta H_{hyd}$ is in general exothermic (for the stable hydrides), the slope is negative. The value of $\Delta H_{hyd}$ closely depends on the stability of the hydride relative to the metallic phase or to the alloy: the more thermodynamically stable the hydride, the more reaction (1) or (3) is exothermic.

The formation enthalpy of the hydride, $\Delta H_{hyd}$, can be expressed based on the variation of internal energy during hydrogenation, $\Delta E_{hyd}$:

$$\Delta E_{hyd} = E_{AB_xH_n} - E_{AB_x} - E_{H_2} \qquad (4)$$

where E represents the internal energy of the hydride phases, metal and the hydrogen molecule in gaseous phase. The internal energy of a material is linked to interactions between the atomic centers that constitute the material and the electrons. This energy is also often called electronic energy and is directly connected to the cohesion energy of the material. The expression of $\Delta H_{hyd}$ based on $\Delta E_{hyd}$ is as follows:

$$\Delta H_{hyd} = \Delta E_{hyd} + P\Delta V + \Delta ZPE + T\Delta c_p \qquad (5)$$

where $\Delta c_p$ represents the calorific capacity variation between the hydride phase and the metal phase, $\Delta ZPE$ is the energy variation at the zero point between the hydride phase and the metal phase, and $\Delta V$ is the variation of molar volume between the hydride phase and the metal phase.

The modern techniques for quantum simulation make it possible to calculate systematically the values of $E_{AB_xH_n}$, $E_{AB_x}$, and $E_{H_2}$ and therefore to derive therefrom the value of $\Delta E_{hyd}$. For a given crystalline phase (known or unknown in an experimental way), the initial crystallographic structure is determined by the space group, the parameters of the primitive cell, and the atomic positions in the mesh of the primitive cell. For existing structures, the crystallographic databases, such as ICSD and CRYSMET, provide this information:

The ICSD (Inorganic Crystal Structure Database) base is the property of the "Fachinformationszentrum Karlsruhe [Technical Information Center of Karlsruhe] (FIZ)" in Germany and the "National Institute of Standards and Technology (NIST)" in the U.S.A. (see also http://www.icsd.ill.fr//);

The CRYSMET base belongs to and is maintained by "Toth Information Systems,"Ottawa, and le Conseil national de recherches [National Research Council] of Canada.

(ICSD and CRYSMET can be accessed within the MedeA interface marketed by Materials Design S.a.r.l., Le Mans (France)).

For the new structures (unknown or not totally resolved experimentally), the same standard description will be adopted in this invention.

For any structure (known or new), the process of rigorous simulation is adopted so as to determine the so-called basic state of the structure, i.e., the stable state of the structure. In this basic state, the values of $E_{AB_xH_n}$, $E_{AB_x}$, $E_{H_2}$, and $\Delta E_{hyd}$ are calculated. This process makes it possible in particular to determine the electronic wave function of the system by optimizing the crystalline structure for the hydride and metal solids and the hydrogen molecule, thanks to modem quantum simulation techniques at the DFT level, accessible in software such as VASP (see references [1] above). For this purpose, the following criteria are imposed during the calculation:

the criterion of convergence of the electronic energy should be set at 0.01 kJ/mol of primitive cell, the criterion of convergence of the atomic positions and that of the volume of the primitive cell of the solid should lead to an energy precision of 0.1 kJ per mol of primitive cell, the grid of points-k used to describe the Brillouin zone should be large enough to ensure a fluctuation of the electronic energy that is weaker than 0.01 kJ per mol of cell, the size of the plane-wave base that is used or the precision of the base that is used should ensure a convergence of the electronic energy of more than 0.1 kJ per mol of primitive cell.

For the applications of storage of on-board hydrogen, a temperature at an equilibrium close to 300 K (1000/T # 3,3 K$^{-1}$) is generally sought for a pressure that is close to 1 atm (about 0.1 MPa). Due to equation (2), this corresponds to a value of $\Delta H_{hyd}$ that is close to -39 kJ per mol of hydrogen. For this invention, and because of the precision of the simulation approach defined above, we will designate materials that are potentially advantageous for storing hydrogen, all the materials whose isothermal plateau verifies the following conditions:

$$270 < T < 370 K (or 2.7 < 1000/T < 3.7 K^{-1})$$

and $$1 < P_{eq} < 10 atm (or\ about\ 0.1 MPa < P_{eq} < about\ 10 MPa). \quad (6)$$

The target window that materializes this domain will be shown in all the Van't Hoff diagrams in the following examples.

According to the invention, the material that consists of magnesium elements and nitrogen elements can also comprise, in a proportion of less than 5% by weight, at least one transition metal of groups 3 to 12 of the periodic table selected from among, for example, Sc, Ti, V, Cr, Mn, Fe, Co, Ni, Cu, Zn and Pd.

The material of the invention can come in solid form or in dispersed form, obtained by, for example, grinding.

The invention is also directed to a process for storing hydrogen using the materials according to the invention. The process is applied to, for example, the storage of on-board, stationary or portable hydrogen.

EXAMPLES

Example 1 is provided by way of comparison, and Example 2 illustrates the invention.

Example 1

(For Comparison): Known Case of Simple Hydrides

The diagram of FIG. 1 plots the values of $\Delta E_{hyd}$ that are calculated according to the process that is described above and the experimental values $\Delta H_{hyd}$ of the literature (see: "CRC Handbook of Chemistry and Physics," 76$^{th}$ Edition 1995-1996, David R. Lide Editor-in-Chief, CRC Press).

The crystallographic structures that are used are those of hydride and metal phases that are stable under conditions that are close to those set forth above in (6). They are recorded in Table 1.

TABLE 1

Simulated Structural Properties and Mass Capacity of Simple Hydrides.

| Hydride | Crystallographic Reference | Space Group | % by Mass | Balance Equation |
|---|---|---|---|---|
| LiH | ICSD.61751 | FM3-M | 22.37 | $2Li + H_2 \rightarrow 2LiH$ |
| NaH | ICSD.33670 | FM3-M | 8.00 | $2Na + H_2 \rightarrow 2NaH$ |
| BeH$_2$ | ICSD.84231 | IBAM | 18.17 | $Be + H_2 \rightarrow BeH_2$ |
| MgH$_2$ | ICSD.26624 | P42/MNM | 7.60 | $Mg + H_2 \rightarrow MgH_2$ |
| CaH$_2$ | ICSD.23870 | PNMA | 4.75 | $Ca + H_2 \rightarrow CaH_2$ |
| YH$_2$ | CRYSMET.36093 | Fm-3m | 2.20 | $Y + H_2 \rightarrow YH_2$ |
| TiH$_2$ | CRYSMET.38081 | Fm-3m | 4.01 | $Ti + H_2 \rightarrow TiH_2$ |
| ZrH$_2$ | CRYSMET.39242 | I4/mmm | 2.15 | $Zr + H_2 \rightarrow ZrH_2$ |

The result of FIG. 1 shows that there is a linear relationship between the two basic values—experimental $\Delta_{hyd}$ and calculated $\Delta E_{hyd}$—on a broad range of representative hydrides. These examples also show that the calculated value $\Delta E_{hyd}$ is a good thermodynamic descriptor for predicting the thermodynamic properties of materials for the purpose of storing hydrogen. The final precision on the energy is on the order of 3 to 5%, which is in agreement with the method of calculation used and the process described above.

Figure 2:
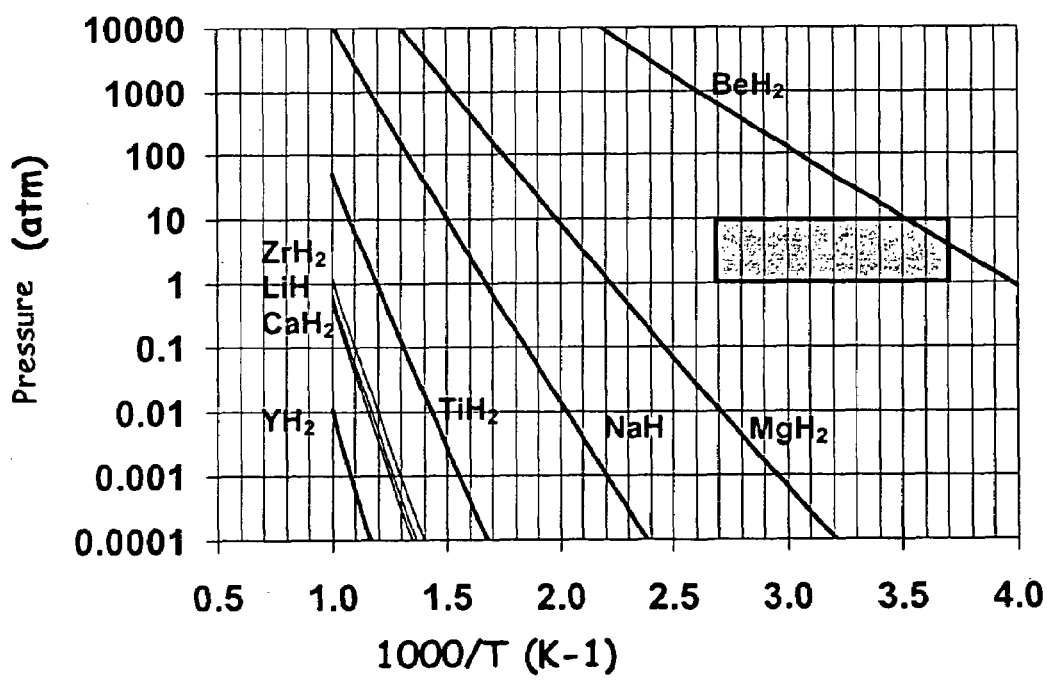
FIG. 2 is the Van't Hoff diagram using the calculated values of $\Delta E_{hyd}$ for simple hydrates.

FIG. 2 represents the translation of these values to the Van't Hoff diagram by using the calculated values of $\Delta E_{hyd}$. As is known experimentally, none of the simple hydrides of Table 1 (except for BeH$_2$, which exhibits other difficulties of operation) makes it possible to come close to the target window that is defined above, which makes it possible to consider the use of these materials for storing hydrogen.

For example, the case of magnesium hydride, which is used as a reference to the following, reveals that $\Delta H_{hyd}(MgH_2)$ is equal to -75.0 kJ per mol of H$_2$ (see references [2] and [3] above). The calculation provides a very close value, on the order of -70.2 kJ per mol of H$_2$. The equilibrium temperature at atmospheric pressure is 575 K experimentally (see reference [2]), which is much too high to be able to be used.

Example 2

Case of the Magnesium Amide Mg(NH$_2$)$_2$

Another structure identified as potentially advantageous relates to the magnesium amide phase, Mg(NH$_2$)$_2$, in equilibrium with the magnesium nitride. These two phases are identified in the crystallographic databases (see Table 2 below).

TABLE 2

Structures of Mg(NH$_2$)$_2$ and Mg$_3$N$_2$

| Formula | Crystallographic Reference | Space Group |
|---|---|---|
| Mg$_3$N$_2$ | ICSD.84917 | IA3- |
| Mg(NH$_2$)$_2$ | ICSD.16222 | I41/ACDZ |

The equilibrium that is used during the storage of hydrogen is as follows:

$$\tfrac{1}{4}Mg_3N_2 + H_2 \rightarrow \tfrac{1}{4}Mg(NH_2)_2 + \tfrac{1}{2}MgH_2$$

Figure 3:
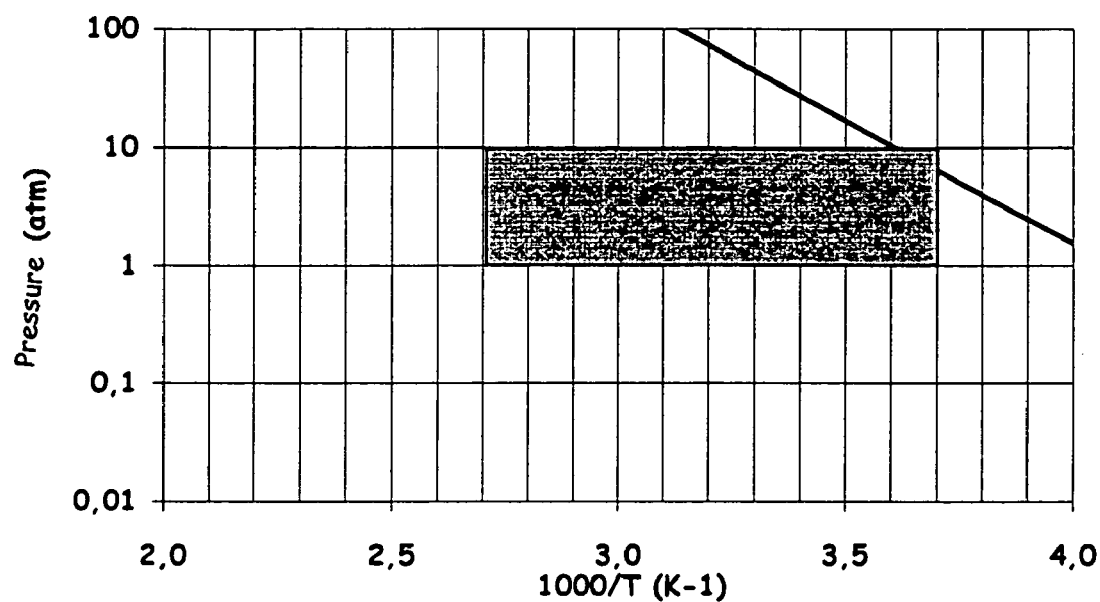
FIG. 3 is the Van't Hoff diagram for the hydride of magnesium and nitrogen.

The calculation of the value of $\Delta E_{hyd}$ according to the process described above results in a value of -31.9 kJ per mol of hydrogen, which is advantageous. for the storage of hydrogen under advantageous conditions (see Equations 6), as the Van't Hoff diagram of FIG. 3 shows.

It is also important to note the intrinsic high mass storage capacity of this material that is around 7.3%, which confirms the great advantage of this system for the targeted application.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 05/01,230, filed Feb. 7, 2005 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for reversible storage of hydrogen, comprising bringing a material comprising magnesium elements, magnesium nitrogen elements and nitrogen elements into contact with gaseous hydrogen leading to the formation of a magnesium amide and magnesium hydrides, wherein a balanced system corresponding to the following formula is achieved:

$$Mg_3N_2 \Leftrightarrow Mg(NH_2)_2 + 2MgH_n$$

where n is the number of hydrogen atoms corresponding to the stoichiometry of the hydride or formed hydrides.

2. Process according to claim 1, wherein the material comprising magnesium elements, magnesium nitrogen and nitrogen elements also comprises, in a proportion of less than 5% by weight, at least one transition metal from groups 3 to 12 of the periodic table that is selected from among Sc, Ti, V, Cr, Mn, Fe, Co, Ni, Cu, Zn and Pd.

3. Process according to claim 1, wherein the material comprising magnesium element, magnesium nitrogen elements and nitrogen elements is in solid form.

4. Process according to claim 1, wherein the material comprising magnesium elements, magnesium nitrogen elements and nitrogen elements is in dispersed form.

5. Process according to claim 4, wherein the material that consists of magnesium elements, magnesium nitrogen elements and nitrogen elements is obtained by grinding.

6. Process according to claim 1, which results in the storage of on-board hydrogen.

7. Process according to claim 1, which results in stationary storage of hydrogen.

8. Process according to claim 1, which results in portable storage of hydrogen.

9. Process according to claim 1, wherein the storage is achieved at a temperature close to 300 K and a pressure close to 1 atm.

10. Process according to claim 1, wherein the storage is achieved a temperature, T, and pressure, $P_{eq}$, of:

$$270 < T < 370 K$$

and $$1 < P_{eq} < 10 atm. \qquad (6)$$

* * * * *

UNITED STATES PATENT AND TRADEMARK OFFICE
CERTIFICATE OF CORRECTION

PATENT NO.       : 7,608,239 B2
APPLICATION NO.  : 11/347578
DATED            : October 27, 2009
INVENTOR(S)      : Raybaud et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Twelfth Day of October, 2010

David J. Kappos
*Director of the United States Patent and Trademark Office*